United States Patent
Suzuki et al.

(10) Patent No.: US 11,108,956 B2
(45) Date of Patent: Aug. 31, 2021

(54) IMAGING APPARATUS WITH HIGH-LOAD AND LOW-LOAD MODE CONTROL

(71) Applicant: Panasonic Intellectual Property Management Co., Ltd., Osaka (JP)

(72) Inventors: Gaku Suzuki, Osaka (JP); Kazuyuki Ohashi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/819,331

(22) Filed: Mar. 16, 2020

(65) Prior Publication Data
US 2020/0304711 A1  Sep. 24, 2020

(30) Foreign Application Priority Data
Mar. 19, 2019  (JP) .................................. 2019-051634

(51) Int. Cl.
*H04N 5/232*  (2006.01)
*H04N 5/225*  (2006.01)

(52) U.S. Cl.
CPC ....... *H04N 5/23241* (2013.01); *H04N 5/2252* (2013.01)

(58) Field of Classification Search
CPC .......................... H04N 5/23241; H04N 5/2252
See application file for complete search history.

(56) References Cited

U.S. PATENT DOCUMENTS 7,432,684 B2 * 10/2008 Iwamoto ............ H04N 5/23241
                                                                320/100

FOREIGN PATENT DOCUMENTS

| JP | 2002-186194 A |   | 6/2002  |
|----|---------------|---|---------|
| JP | 2007-017702 A |   | 1/2007  |
| JP | 2007017702 A  | * | 1/2007  |
| JP | 2008-220098 A |   | 9/2008  |
| JP | 2016208648 A  | * | 12/2016 |

* cited by examiner

*Primary Examiner* — Ahmed A Berhan
(74) *Attorney, Agent, or Firm* — Renner, Otto, Boisselle & Sklar, LLP (57) ABSTRACT

An imaging apparatus which can be mounted with a first battery and a second battery includes: a load circuit configured to operate the imaging apparatus; and a control circuit configured to control power supply to the load circuit based on a first battery voltage in the first battery and a second battery voltage in the second battery. In a high-load mode, the control circuit selects any one of the first battery, the second battery, and a combination of the first and second batteries in accordance with the first and second battery voltages, to supply power to the load circuit. In a low-load mode, the control circuit selects either one of the first battery and the second battery in accordance with the first and second battery voltages without selecting the combination of the first and second batteries, to supply power to the load circuit.

9 Claims, 6 Drawing Sheets

IMAGING APPARATUS WITH HIGH-LOAD AND LOW-LOAD MODE CONTROL

BACKGROUND

1. Technical Field

The present disclosure relates to an imaging apparatus operable with power from a plurality of batteries.

2. Related Art

JP 2007-17702 discloses a power supply controller for the purpose of enabling performance of a battery to be sufficiently exhibited in power supply in an equipment such as a camera. The power supply controller includes a first connection part that can be connected to a first battery, a second connection part that can be connected to a second battery, and a supply means that can supply power to equipment being a power supply object from at least one of the first battery or the second battery. The supply means performs first power supply for supplying power from the first battery to the equipment in first load operation, and performs second power supply for supplying power to the equipment, from both the first battery and the second battery in second load operation in which load is larger than in the first load operation.

SUMMARY

The present disclosure provides an imaging apparatus capable of efficiently using power of plurality of batteries.

An imaging apparatus according to the present disclosure can be mounted with a first battery and a second battery, for capturing an object image to generate image data. The imaging apparatus includes: a load circuit configured to operate the imaging apparatus; and a control circuit configured to control power supply to the load circuit based on a first battery voltage in the first battery and a second battery voltage in the second battery. The imaging apparatus a high load mode in which power supplied to the load circuit is a predetermined value or more, and a low-load mode in which power supplied the load circuit is less than the predetermined value. In the high-load mode, the control circuit selects any one of the first battery, the second battery, and a combination of the first and second batteries in accordance with the first and second battery voltages, to supply power to the load circuit. In the low-load mode, the control circuit selects either one of the first battery and the second battery in accordance with the first and second battery voltages without selecting the combination of the first and second batteries, to supply power to the load circuit.

In the imaging apparatus of the present disclosure, in accordance with each battery voltage, one or both the first and second batteries supply power to the load circuit in the high-load mode while the first or second battery supplies power in the low-load mode, and power from a plurality of batteries can be efficiently used.

DETAILED DESCRIPTION

Hereinafter, embodiments will be described in detail with reference to the drawings as needed. However, explanation more detailed than necessary may be omitted. For example, detailed descriptions of well-known matters and redundant explanations for substantially the same configuration may be omitted. This is to avoid unnecessary redundancy of the following description and to facilitate understanding by those skilled in the art. It is to be noted that the inventor(s) provides the accompanying drawings and the following description in order to enable those skilled in the art to fully understand the present disclosure, and does not intend to limit the claimed subject matter by them.

Hereinafter, embodiments will be described in detail with reference to the drawings.

First Embodiment

Hereinafter, a digital camera according to an embodiment will be described with reference to the drawings.

1. Configuration

Hereinafter, a configuration of the digital camera will be described with reference to the drawings.

Figure 1:
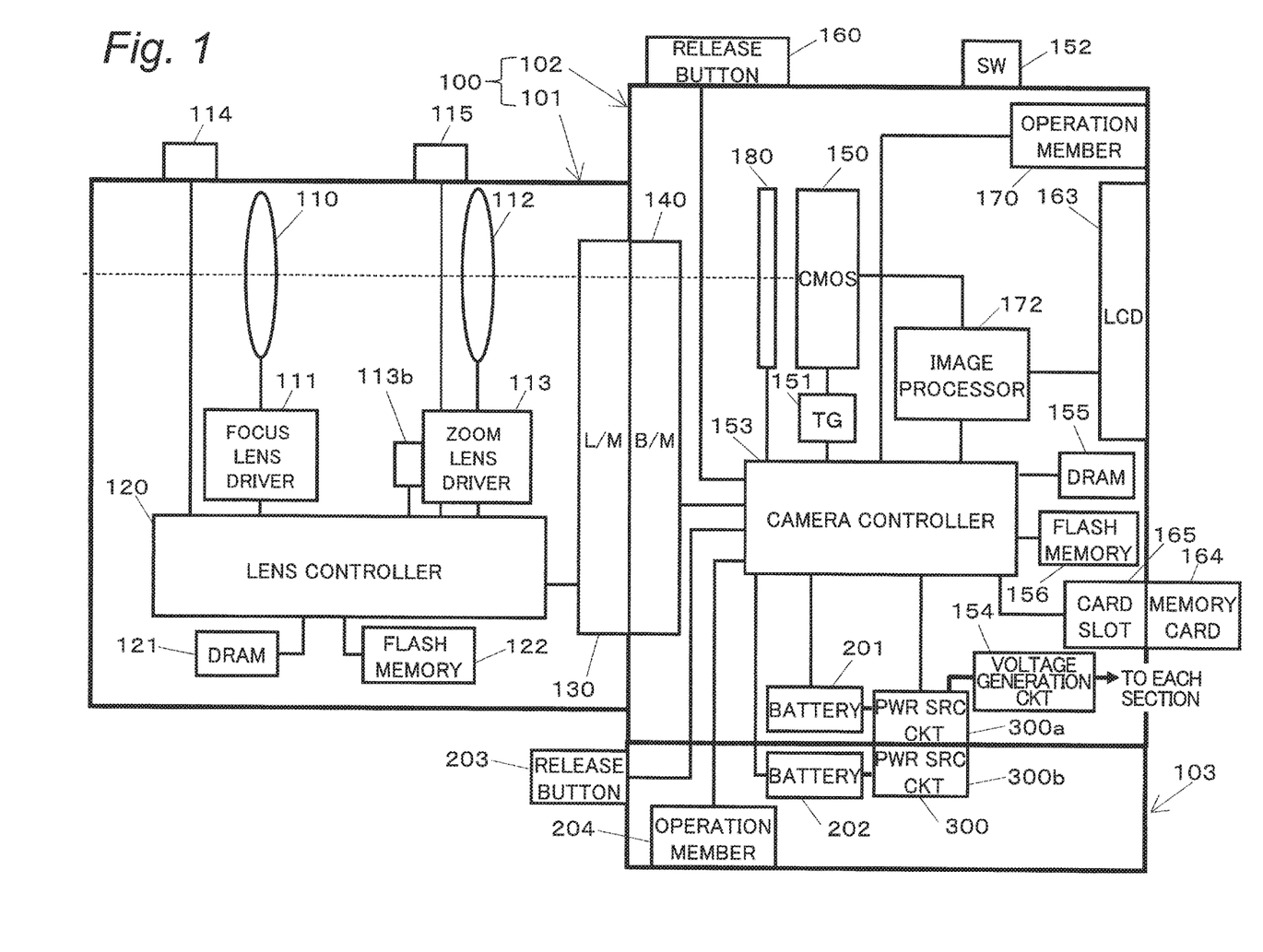
FIG. 1 is a block diagram showing a configuration of a digital camera according to a first embodiment of the present disclosure.

FIG. 1 is a block diagram showing a configuration of a digital camera 100 according to a first embodiment. The digital camera 100 includes a camera body 102, and an interchangeable lens 101 that can be mounted to the camera body 102. A removable battery grip 103 is mounted to the camera body 102. The interchangeable lens 101 has a zoom lens 112 driven by a zoom lens driver 113. The camera body 102 can electrically drive the zoom lens 112 via a lens controller 120. That is, the interchangeable lens 101 is an electrically powered zoom lens.

The camera body 102 can be removably mounted with a battery 201 (hereinafter referred to as "body battery 201"), and has a power supply selection circuit 300a. The battery grip 103 can be mounted with a battery 202 (hereinafter referred to as "BG battery 202"), and includes a power supply selection circuit 300b. The power supply selection circuit 300a and the power supply selection circuit 300b form a power supply selection circuit 300. The camera body 102 can control the power supply selection circuit 300 by a camera controller 153. That is, the camera body 102 can select which of the body battery 201 and the BG battery 202 is to be used, or both of them to be used. Each section of the digital camera 100 is an example of a load circuit in the present embodiment.

1-1. Configuration of Camera Body

The camera body 102 includes a CMOS image sensor 150, a liquid crystal monitor 163, an image processor 172, a timing generator (TG) 151, the camera controller 153, a body mount 140, a release button 160, an operation member 170, the body battery 201, the power supply selection circuit 300a, a power switch 152, a voltage generation circuit 154, a DRAM 155, a flash memory 156, card slot 165, and a shutter 180.

The camera controller 153 controls an overall operation of the digital camera 100 by controlling each section of the digital camera 100 such as the CMOS image sensor 150, in accordance with an instruction such as an operation signal from an operation member such as the release button 160 or the operation member 170.

For example, the camera controller 153 transmits a vertical synchronization signal to the timing generator 151. In parallel with the transmission of the vertical synchronization signal, the camera controller 153 generates an exposure synchronization signal on the basis of the vertical synchronization signal. The camera controller 153 periodically and repeatedly transmits the generated exposure synchronization signal to the lens controller 120 via the body mount 140 and a lens mount 130. This allows the camera controller 153 to control a lens such as a focus lens 110 in the interchangeable lens 101 to be synchronized with timing of exposure.

The camera controller 153 uses the DRAM 155 as a work memory at a time of a control operation and an image processing operation. The camera controller 153 may be configured by a hard-wired electronic circuit, or may be configured by a microcomputer or the like that executes a program. In addition, the camera controller 153 may be configured as one semiconductor chip together with the image processor 172 and the DRAM 155, or may be configured as a separate semiconductor chip.

The CMOS image sensor 150 is configured to include a light receiving device, a gain control amplifier (AGC), and an AD converter. The light receiving device converts an optical signal collected by the interchangeable lens 101 into an electric signal, to generate image information. Further, the AGC amplifies an electrical signal output from the light receiving device. The AD converter converts an electrical signal output from the AGC into a digital signal.

The CMOS image sensor 150 operates at timing controlled by the timing generator 151. Operations of the CMOS image sensor 150 controlled by the timing generator 151 include an imaging operation for a still image, an imaging operation for a through image, a data transfer operation, an electronic shutter operation, and the like. The through image is mainly a moving image, and is displayed on the liquid crystal monitor 163 in order for a user to determine a composition for capturing a still image. The CMOS image sensor 150 outputs the generated image information to the image processor 172. Meanwhile, instead of the CMOS image sensor 150, another imaging device such as an NMOS image sensor or a CCD image sensor may be used.

The image processor 172 performs predetermined image processing on image data converted into a digital signal by the AD converter in the CMOS image sensor 150. For example, the predetermined image processing includes gamma correction processing, white balance correction processing, flaw correction processing, YC conversion processing, digital zoom processing, compression processing, expansion processing, and the like, but is not limited thereto.

The liquid crystal monitor 163 is a display disposed on a back surface of the camera body 102. The liquid crystal monitor 163 displays an image indicated by display image information processed by the image processor 172. The liquid crystal monitor 163 can selectively display a moving image and a still image. The liquid crystal monitor 163 can also display an image for notifying the user of information such as setting conditions of the digital camera 100. In the present embodiment, the camera body 102 includes the liquid crystal monitor 163 as an example of the display, but the display is not limited to this. For example, the camera body 102 may include an organic EL display as a display.

The flash memory 156 functions as an internal memory to store image information and the like. Further, the flash memory 156 stores programs and parameters used when the camera controller 153 performs control.

The card slot 165 is a connection means that enables a memory card 164 to be mounted to the camera body 102. The card slot 165 can connect the memory card 164 electrically and mechanically. The card slot 165 may have a function of controlling the memory card 164.

The memory card 164 is an external memory that is internally provided with a storage element such as a flash memory. The memory card 164 can store data such as image information processed by the camera controller 153. Further, the memory card 164 can output data such as image information stored therein. The image data read out from the memory card 164 is processed by the camera controller 153 or the image processor 172, and displayed on the liquid crystal monitor 163, for example. In the present embodiment, the memory card 164 is shown as an example of the external memory, but the external memory is not limited to this. For example, a recording medium such as an optical disc can be used as the external memory.

The body mount 140 can be mechanically and electrically connected to the lens mount 130 (described later) of the interchangeable lens 101. The body mount 140 can transfer data between the camera body 102 and the interchangeable lens 101 via the lens mount 130. The body mount 140 transmits an exposure synchronization signal and other control signals received from the camera controller 153, to the lens controller 120 via the lens mount 130. Further, the body mount 140 transmits a signal received from the lens controller 120 via the lens mount 130, to the camera controller 153.

The body battery 201 supplies power for driving the digital camera 100. The body battery 201 may be, for example, a dry battery or a rechargeable battery. Further, instead of the battery, power supplied from outside through a power cord may be supplied to the digital camera 100. A power supply of the digital camera 100 is switched between on and off by the power switch 152 being operated by the user. When the power supply is turned on, the camera controller 153 supplies power to each section in the camera body 102. Further, the camera controller 153 also supplies power to the interchangeable lens 101 via the body mount 140 and the lens mount 130. Then, in the interchangeable lens 101, power is supplied to each section of the interchangeable lens 101 by the lens controller 120.

The power supply selection circuit 300a of the camera body 102 forms a part of the power supply selection circuit 300. The power supply selection circuit 300 selects a power supply for supplying power to the digital camera 100, from one or both of the body battery 201 included in the camera body 102 and the BG battery 202 included in the battery grip 103 (described later). The power supply selection circuit 300 outputs power from the selected power supply to the voltage generation circuit 154. The power supply selection circuit 300 is controlled by the camera controller 153.

The voltage generation circuit 154 includes a DC/DO converter, a regulator, and the like, to supply power from the power supply selection circuit 300 to each section (load circuit) of the digital camera 100. The voltage generation circuit 154 converts a voltage supplied from the power supply into a voltage suitable for each section when supplying power to each section.

The release button 160 accepts an operation of an imaging instruction or an auto-focus instruction from the user. The release button 160 allows two-step operation of half press and full press. The camera controller 153 executes an auto-focus operation by the half-press operation by the user on the release button 160. By the full-press operation by the user on the release button 160, the camera controller 153 records image data generated in accordance with timing of the full-press operation, in the memory card 164.

The operation member 170 includes a cross button capable of receiving operation instruction in up, down, left, and right directions. When the interchangeable lens 101 having an electric zoom function is mounted to the camera body 102, the camera controller 153 individually assigns functions as zoom operation buttons to the left and the right buttons of the operation member 170. For example, the camera controller 153 assigns a function as a zoom operation button in a wide-end side direction to the left button, and assigns a function as a zoom operation button in a tele-end side direction to the right button. In a case that the interchangeable lens 101 having the electric zoom function mounted on the camera body 102 has a zoom lever for the user to perform zoom operation, the function as the zoom operation button does not necessarily need to be assigned to the operation member 170.

The shutter 180 adjusts an exposing time (exposure time) of light incident on the CMOS image sensor 150. The shutter 180 is driven by a drive system such as a DC motor or stepping motor, for example, in accordance with a control signal issued from the camera controller 153. For example, the camera controller 153 can control a driving speed (shutter speed or continuous-shooting speed) at which the shutter 180 is driven.

1-2. Configuration of Interchangeable Lens

The interchangeable lens 101 includes the focus lens 110, a focus lens driver 111, a focus ring 114, the zoom lens 112, the zoom lens driver 113, a zoom ring 115, the lens controller 120, a DRAM 121, a flash memory 122, and the lens mount 130. The interchangeable lens 101 may further include a camera shake correction lens in addition to the lenses shown in FIG. 1.

The lens controller 120 controls an overall operation of the interchangeable lens 101. The lens controller 120 may be configured by a hard-wired electronic circuit, or may be configured by a microcomputer or the like that executes a program.

The DRAM 121 functions as a work memory used when the lens controller 120 performs control. The flash memory 122 stores programs, parameters, lens data, and the like to be used in control y the lens controller 120. The lens data includes characteristic values unique to the interchangeable lens 101, such as a lens name, a lens ID, a serial number, an F number, and a focal distance. As described later, the lens controller 120 can notify the camera controller 153 with lens data, and the camera controller 153 can execute various control operations in accordance with the lens data.

The zoom lens 112 is a lens to change magnification of an object image formed by an optical system of the interchangeable lens 101. The zoom lens 112 may be composed of any number of lenses or any number of groups of lenses.

The zoom lens driver 113 is a mechanical mechanism that moves the zoom lens 112 along the optical axis of the optical system on the basis of an operation of the zoom ring 115 by the user. A position of the zoom lens 112 is detected by a zoom lens position detector 113b at any time, and notified to the lens controller 120.

The focus lens 110 is a lens to change a focus state of an object image that is incident from the optical system and formed on the CMOS image sensor 150. The focus lens 110 may be composed of any number of lenses or any number of groups of lenses.

The focus ring 114 is provided on the exterior of the interchangeable lens 101. When the focus ring 114 is operated by the user, information on an operation amount of the focus ring 114 is notified to the lens controller 120. The lens controller 120 controls the focus lens driver 111 to drive the focus lens 110 on the basis of the notified information on the operation amount of the focus ring 114. Thus, the lens controller 120 recognizes a position of the focus lens 110.

The focus lens driver 111 drives the focus lens 110 to move forward or backward along the optical axis of the optical system, on the basis of the control by the lens controller 120. The focus lens driver 111 can be realized by, for example, a stepping motor, a DC motor, an ultrasonic motor, or the like.

1-3. Configuration of Battery Grip

The battery grip 103 includes the BC battery 202, the power supply selection circuit 300b, a release button 203, and an operation member 204.

The BG battery 202 supplies power for driving the digital camera 100. The battery 202 may be, for example, a dry battery or a rechargeable battery. Further, instead of the battery, power supplied from outside through a power cord may be supplied to the digital camera 100.

The power supply selection circuit 300b forms a portion for connecting the BG battery 202 from the battery grip 103 side to the camera body 102 side in the power supply selection circuit 300. Further, the power supply selection circuit 300b is controlled by the camera controller 153.

The release button 203 accepts an operation of an imaging instruction or an auto-focus instruction from the user. The release button 203 allows two-step operation of half press and full press. The camera controller 153 executes an auto-focus operation by the half-press operation by the user on the release button 203. By the full-press operation by the user on the release button 203, the camera controller 153 records image data generated in accordance with timing of the full-press operation, in the memory card 164.

The operation member 204 includes a cross button capable of receiving operation instruction in up, down, left, and right directions. When the interchangeable lens 101 having an electric zoom function is mounted to the camera body 102, the camera controller 153 individually assigns functions as zoom operation buttons to the left and the right buttons of the operation member 204. For example, the camera controller 153 assigns a function as a zoom operation button in a wide-end side direction to the left button, and assigns a function as a zoom operation button in a tele-end side direction to the right button. In the case that the interchangeable lens 101 having the electric zoom function mounted on the camera body 102 has a zoom lever for the user to perform zoom operation, the function as the zoom operation button does not necessarily need to be assigned to the operation member 204.

1-4. Configuration of Power Supply Selection Circuit

A detailed configuration of the power supply selection circuit 300 will be described with reference to FIG. 2. The power supply selection circuit 300 includes the power supply selection circuit 300a provided on the camera body 102 side, and the power supply selection circuit 300b provided on the battery grip 103 side.

The power supply selection circuit 300 performs selection of the power supply in the digital camera 100, for example, by the control of the camera controller 153 outputting various signals B11 to 314 and B20 to B24 on the based on detecting a body battery voltage V1 and a BG battery voltage V2. The body battery voltage V1 is a voltage corresponding to a remaining capacity of the body battery 201. The BG battery voltage V2 is a voltage corresponding to a remaining capacity of the BG battery 202. In the present embodiment, the power supply is selected from any of the body battery 201, the BG battery 202, and a combination of both of the batteries 201 and 202.

The power supply selection circuit 300a on the camera body 102 side includes, for example, a voltage detection circuit 301 that detects the body battery voltage V1. The voltage detection circuit 301 is configured by, for example, a voltage-dividing resistor circuit connected between a positive electrode and a negative electrode of the body battery 201. The voltage detection circuit 301 generates a detection signal Sv1 indicating a detection value of the body battery voltage V1, such as a divided voltage, to output the detection signal Sv1 to the camera controller 153.

The power supply selection circuit 300a includes two power supply lines 310 and 320 for supplying power from the body battery 201, and two power supply lines 330 and 340 for supplying power from the PG battery 202. The two lines 310 and 320 for the body battery 201 include the power supply line 310 to be used when the body battery 201 is selected as the power supply, and the power supply line 320 to be used when both batteries 201 and 202 are selected. Similarly, the two lines 330 and 340 for the PG battery 202 similarly include the power supply line 330 to be used when the PG battery 202 is selected, and the power supply line 340 to be used when both batteries 201 and 202 are selected.

Figure 2:
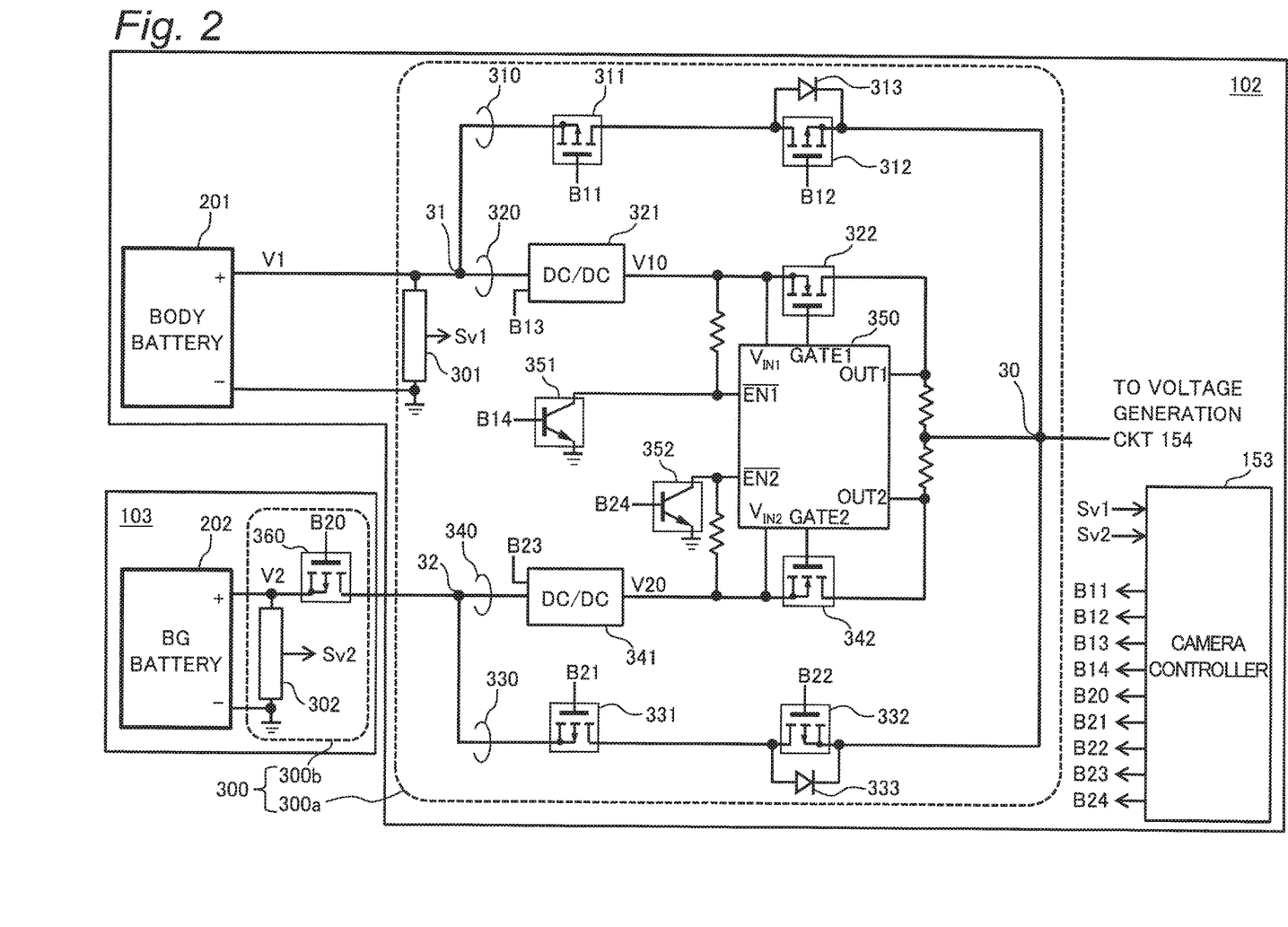
FIG. 2 is a diagram showing a configuration of a power supply selection circuit in the digital camera.

In the example of FIG. 2, the two power supply lines 310 and 320 for the body battery 201 are connected to each other at an input node 31. Further, the two power supply lines 330 and 340 for the PG battery 202 are connected to each other at an input node 32. The four power supply lines 310, 320, 330, and 340 are connected to each other at an output node 30. The power supply selection circuit 300 realizes the power supply to various load circuits in the digital camera 100 by an output from the output node 30 to the voltage generation circuit 154.

On one power supply line 310 for the body battery 201, for example, the power supply selection circuit 300a includes two PMOSFETs 311 and 312 connected in series to each other, and a diode 313 connected in parallel to the PMOSFET 312. The PMOSFET 311 controls conduction or interruption of a current flowing from the body battery 201 to the power supply line 310. The diode 313 allows a current in a direction from the body battery 201 toward the load circuit to pass through, and inhibits a current in the reverse direction. The PMOSFET 312 controls whether or not to allow a current flowing through the power supply line 310 to pass through the diode 313.

The PMOSFET 311 is provided on the power supply line 310 such that a source is connected to the input node 31 and a drain is connected to a drain of the PMOSFET 312. The PMOSFET 311 is turned off when a gate signal B11 indicating a gate voltage applied to a gate is at a high level (hereinafter abbreviated as "H"). Further, the PMOSFET 311 is turned on when the gate signal 311 is at a low level (hereinafter abbreviated as "L"). The PMOSFET 311 conducts the power supply line 310 at ON state and interrupts the power supply line 310 at OFF state.

A source of PMOSFET 312 is connected to, the output node 30 on the power supply line 310. The PMOSFET 312 is turned off when a gate signal 312 is "H". At this time, the body battery 201 and the output node 30 are conducted via the diode 313. The PMOSFET 312 is turned on when the gate signal 312 is "L", to conduct directly between the body battery 201 and the output node 30 without passing through the diode 313.

An anode of the diode 313 is connected to the drain of the PMOSFET 312, and a cathode is connected to the source of the PMOSFET 312. The diode 313 may be realized as a parasitic diode of the PMOSFET 312, or may be configured separately from the PMOSFET 312. The PMOSFET 311 has a parasitic diode in a direction opposite to that of the PMOSFET 312. Each of the PMOSFETs 311 and 312 is an example of a switch circuit in the power supply selection circuit 300.

On the power supply line 320, which is used when both batteries 201 and 202 are selected, on the body battery 201 side, the power supply selection circuit 300a includes a DC/DC converter 321 to convert the body battery voltage V1 into a converted voltage V10 of a predetermined value, and an NMOSFET 322 to adjust a current flowing out of the power supply line 320 on the basis of the converted voltage V10.

The DC/DC converter 321 generates the converted voltage V10 on the basis of the body battery voltage V1 input from the body battery 201, when a control signal 313 is "H", for example. The operation of generating the converted voltage V10 is performed within a predetermined tolerance from a desired value (e.g., 7 V±0.2 V). The DC/DC converter 321 stops the operation of generating the converted voltage V10 when the control signal B13 is "L".

A source of the NMOSFET 322 is connected to the DC/DC converter 321, and a drain is connected to the output node 30 via a resistor. The NMOSFET 322 increases a current between the source and the drain as a gate voltage increases.

Similarly to the above, on the power supply line 340 on the BG battery 202 side, the power supply selection circuit 300a includes a DC/DC converter 341 and an NMOSFET 342. The DC/DC converter 341, operating similarly to the above-described DC/DC converter 321 in accordance with a control signal B23, generates a converted voltage V20 from the BG battery voltage V2. The NMOSFET 342 is connected to the DC/DC converter 341 at a source, and is connected to the output node 30 via a resistor at a drain, to adjust a current flowing out of the power supply line 340 on the basis of the converted voltage V20. The NMOSFETs 322 and 342 are turned off when the respective gate voltages fall below a threshold voltage.

Furthermore, the power supply selection circuit 300a includes, for example, a load sharing controller 350 that operates so as to share a load between both batteries 201 and 202, and NPN transistors 351 and 352 to control an operation of the load sharing controller 350. The load sharing controller 350 is provided to suppress a voltage difference between the converted voltage V10 output from the DC/DC converter 321 and the converted voltage V20 output from the DC/DC converter 341. The load sharing controller 350 may be configured by, for example, two-supply diode-OR current balancing controller (Model No. LTC4370) of Analog Devices, Inc.

Collectors of the individual transistors 351 and 352 are respectively connected to enable terminals /EN1 and /EN2 of the load sharing controller 350 ("/" indicates a superscript bar). Emitters of the transistors 351 and 352 are grounded. Each of the transistors 351 and 352 is respectively turned on when the signals B14 and B24 supplied to the base is "H", and turned off when each signal is "L" respectively.

The enable terminals /EN1 and /EB2 of the load sharing controller 350 are connected to the power supply lines 320 and 340 via resistors, respectively. For example, the load sharing controller 350 operates, when the enable terminals /EN1 and /EB2 are grounded via the respective transistors 351 and 352. The load sharing controller 350 stops operation when the enable terminals /EN1 and /EB2 have the same potential as that of the power supply lines 320 and 340.

The load sharing controller 350 has an input terminal $V_{IN1}$ connected between the DC/DC converter 321 and the source of the NMOSFET 322, and a detection terminal OUT1 connected between the drain and the resistor, on the power supply line 320. Similarly, on the power supply line 340, the load sharing controller 350 has an input terminal $V_{IN2}$ connected to the source side of the NMOSFET 342, and detection terminal OUT2 connected to its drain side.

Further, the load sharing controller 350 has drive terminals GATE1 and GATE2 connected to the respective gates of the NMOSFETs 322 and 342. On the basis of a voltage detected at each of terminals $V_{IN1}$, $V_{IN2}$, OUT1, and OUT2, the load sharing controller 350 controls gate voltages or individual NMOSFETs 322 and 342 at the respective drive terminals GATE1 and GATE2 so as to distribute a load current between the two power supply lines 320 and 340. Further, when the operation of the load sharing controller 350 is stopped, the gate voltages of the NMOSFETs 322 and 342 fall below a threshold voltage, and thus the NMOSFETs 322 and 342 interrupt the power supply lines 320 and 340, respectively. Each of the NMOSFETs 322 and 342 is an example of a switch circuit.

Similarly to the power supply line 310 for the body battery 201, the power supply selection circuit 300a includes two PMOSFETs 331 and 332 and a diode 333 on the remaining power supply line 330 for the BC battery 202, for example. Each of the PMOSFETs 331 and 332 is an example of a switch circuit.

A source of the PMOSFET 331 is connected to the input node 32, and a drain is connected to a drain of the PMOSFET 332. The PMOSFET 331 operates similarly to the PMOSFET 311 described above on the basis of a gate signal B21, controlling conduction or interruption of a current flowing from the BG battery 202 to the power supply line 340.

A source of PMOSFET 332 is connected to the output node 30 on the power supply line 330. The PMOSFET 332 operates similarly to the PMOSFET 312 described above on the basis of a date signal B22, controlling whether or not to allow a current flowing through the power supply line 330 to pass through the diode 333. Note that the PMOSFET 331 and the PMOSFET 332 have parasitic diodes in mutually opposite directions. Each of the PMOSFETs 311 and 312 is an example of a switch circuit.

An anode of the diode 333 is connected to the drain of the PMOSFET 332, and a cathode is connected to the source of the PMOSFET 332. Similarly to the diode 313 described above, the diode 333 allows a current in a direction from the BG battery 202 toward the load circuit to pass through, and inhibits a current in the reverse direction. The diode 333 may be realized as a parasitic diode of the PMOSFET 332, or may be configured separately from the PMOSFET 332.

The power supply selection circuit 300b on the battery grip 103 side includes, for example, a voltage detection circuit 302 to detect the BG battery voltage V2, and a PMOSFET 360 to control conduction and interruption of a current flowing from the BG battery 202. The BG battery 202 is connected to a source of the PMOSFET 360, for example, at a positive electrode. The voltage detection circuit 302 is configured similarly to the voltage detection circuit 301 the body battery 201, for example, and generates detection signal Sv2 indicating a detection value of the BG battery voltage V2, to output the detection signal Sv2 to the camera controller 153.

A drain of the PMOSFET 360 is connected to the input node 32 of the two power supply lines 330 and 340 for the BG battery 202. When a gate signal B20 is "L", the PMOSFET 360 is turned on and conducts between the BG battery 202 and each of the power supply lines 330 and 340. When the gate signal B20 is "H", the PMOSFET 360 is turned off to interrupt between the BG battery 202 and each of the power supply lines 330 and 340. The PMOSFET 360 is an example of a switch circuit.

2. Operation

Hereinafter, an operation of the digital camera 100 configured as described above will be described.

The digital camera 100 according to the present embodiment performs various operations for capturing an object image to generate image data in various operation modes. The operation modes of the digital camera 100 include a high-load mode in which a load circuit uses significantly large power (e.g., 15 W or more), and a low-load mode in which a load circuit can operate with less power than that of the high-load mode.

The high-load modes include, for example, a high-quality moving image mode for photographing a moving image with high quality such as 4K or 8K, and a high-speed continuous shooting mode for continuously shooting still images at a continuous-shooting speed equal to or more than a predetermined value (e.g., 10 images/second). The load circuits requiring significant power are, for example, the image processor 172 in the high-quality moving image mode, the shutter 180 in the high-speed continuous shooting mode, and the like.

One example of the low-load modes is a moving image mode using lower image quality (e.g., HD or FHD) than that of the high quality moving image mode. Further, the low-load modes include, for example, a medium-speed or low-speed continuous shooting mode for continuously shooting at a continuous-shooting speed lower than the above predetermined value, and a still image mode for shooting a still image without continuous shooting in particular.

The digital camera 100 according to the present embodiment can perform an operation in the high-load mode for a long time, by enabling the simultaneous power supply to the load circuit from the body battery 201 and the HG battery 202. In addition, even when each of the batteries 201 and 202 is small and has a small capacity, an operation period in the high-load mode of the digital camera 100 can be easily secured because a combination of both batteries 201 and 202 can be selected.

Here, if the simultaneous power supply from both batteries 201 and 202 were always performed, the influence of power loss would be conceivable such as loss of power for the voltage conversion of the DC/DC converters 321 and 341 (FIG. 2) in the power supply selection circuit 300 becoming remarkable. To solve this problem, the digital camera 100 of the present embodiment restricts the selection of both batteries 201 and 202 to the high-load mode operation, and operates with power from the body battery 201 alone or the BG battery 202 alone in the low-load mode. This can reduce the power loss due to the selection of both batteries 201 and 202, and can efficiently use the power in the digital camera 100.

2-1. Power Control in High-Load Mode

Furthermore, even in the high-load mode, simultaneous selection of both batteries 201 and 202 is limited. This point will be described with reference to FIG. 3.

Figure 3:
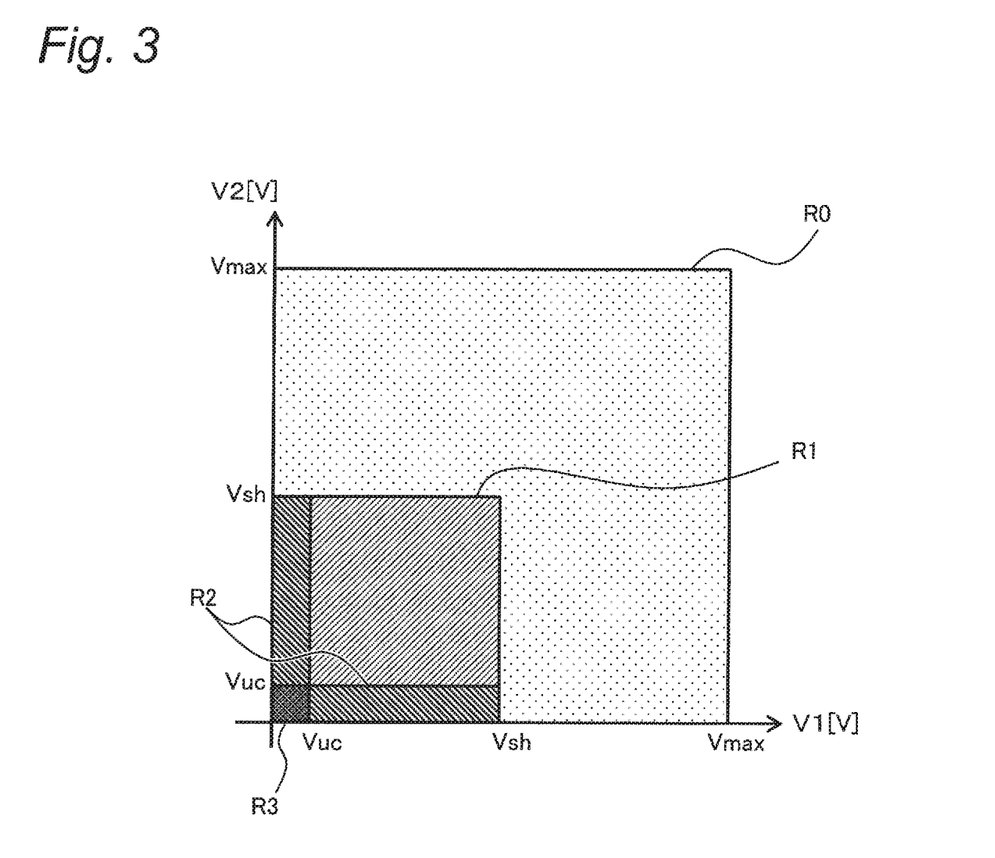
FIG. 3 is a diagram for describing a method of controlling a power supply of the digital camera in a high-load mode.

FIG. 3 is a diagram for describing a method of controlling a power supply of the digital camera 100 in the high-load mode. In FIG. 3, a horizontal axis represents the body battery voltage V1 [V], and a vertical axis represents the BG battery voltage V2 [V]. Vmax represents a voltage value when the individual battery voltages V1 and V2 are fully charged, and is 8.4 V, for example.

In the digital camera 100 of the present embodiment, a case of performing simultaneous selection of both batteries 201 and 202 (and control of load sharing associated therewith) is restricted to a case where the body battery voltage V1 and the BG battery voltage V2 are within a range of a specific control region R1, as shown in FIG. 3. The control region R1 is, for example, defined by an upper limit value Vsh indicating an upper limit for performing control to share a load between both batteries 201 and 202, and a lower limit value Vuc indicating a lower limit to secure power to allow the digital camera 100 to operate.

The upper limit value Vsh and the lower limit value Vuc of the control region R1 are set, for example, commonly between the body battery voltage V1 and the BG battery voltage V2. The upper limit value Vsh is set in consideration of stability of the operation in the high-load mode by simultaneous selection of both batteries 201 and 202 and reduction of the power loss, and the upper limit value Vsh is 7.2 V, for example. The lower limit value Vuc is set in consideration of, for example, a situation where a stable operation is not to be obtained even if load sharing control is performed on both batteries 201 and 202, and the lower limit value Vuc is 6.2 V, for example.

As shown in a region R0 of FIG. 3, when at least one of the body battery voltage V1 or the BG battery voltage V2 exceeds the upper limit value Vsh of the load-sharing control region R1, either one of the body battery 201 and the BG battery 202 is selected as a power supply. In the region R0, since a battery voltage of the selected battery is sufficiently large (Vsh or more), the digital camera 100 can perform a high-load mode operation with a single battery as a power supply.

Further, when the individual battery voltages V1 and V2 decrease to reach the load-sharing control region R1, both batteries 201 and 202 are simultaneously selected as the power supply. As a result, power from each of the batteries 201 and 202 can be efficiently used in the digital camera 100, by reducing the situation of power loss while increasing the number of cases capable of operating in the high-load mode.

Further, as shown in a region R2 of FIG. 3, when one of the two battery voltages V1 and V2 falls below the lower limit value Vuc, the digital camera 100 according to the present embodiment stops the simultaneous selection of both batteries 201 and 202 and restricts the operation under execution in the high-load mode. For example, when reaching to the region R2 during operation in the high-quality moving image mode, the digital camera 100 stops recording of the moving image. Thus, by restricting the operation in the high-load mode, the load (or power consumption) can be reduced. The operation mode after the restriction is classified into the low-load mode.

Furthermore, the digital camera 100 of the present embodiment forcibly stops the operation of the digital camera 100 when both battery voltages V1 and V2 fall below the lower limit value Vuc, as shown in a region R3 of FIG. 3. Hereinafter, details of the operation of the digital camera 100 as described above will be described.

2-2. Power Supply Selection Process

A power supply selection process for selecting a power supply in the digital camera 100 according to the present embodiment will be described with reference to FIGS. 4 and 5. In the following, a processing example when the BG battery 202 is preferentially used as a power supply of the digital camera 100 will be described.

Figure 4:
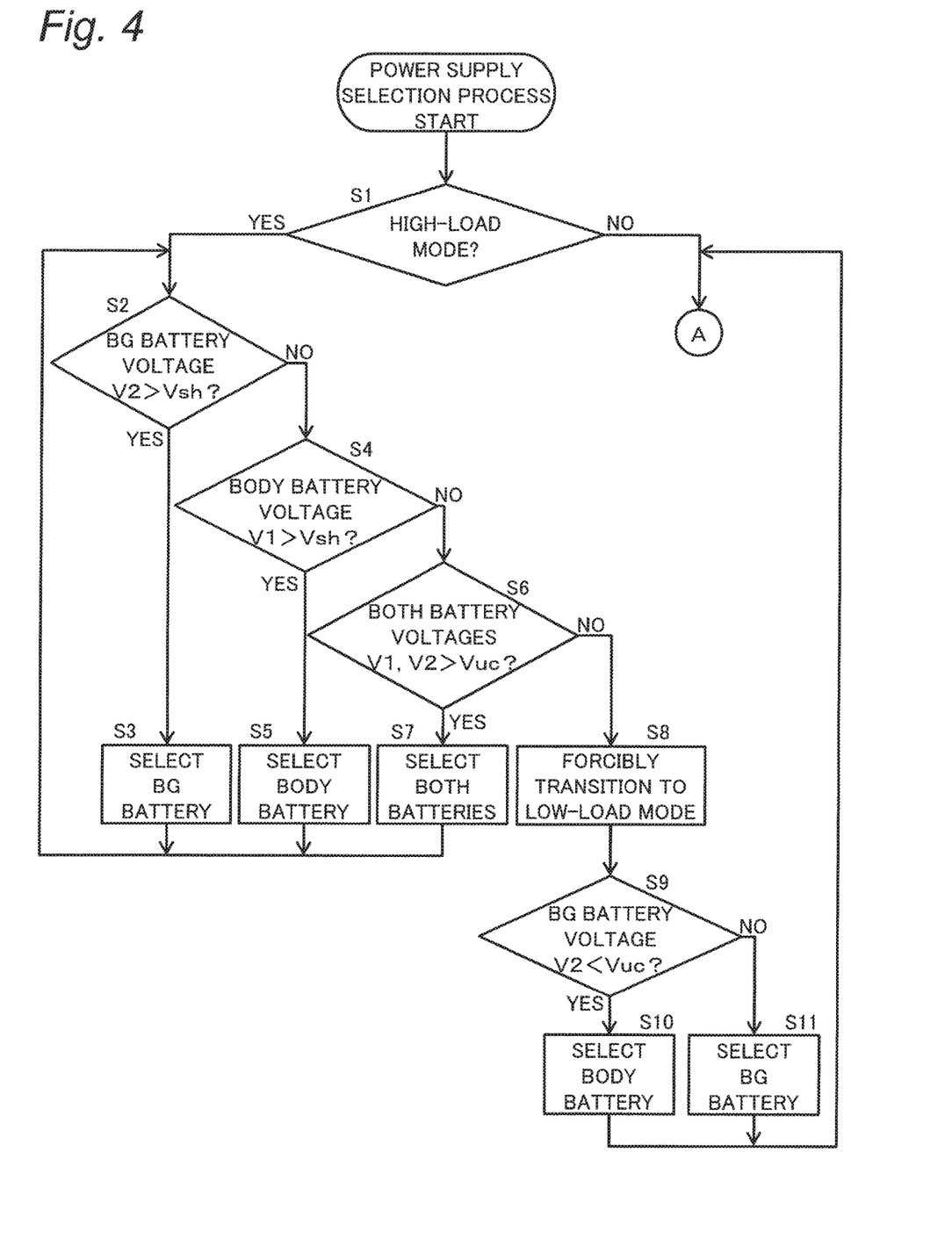
FIG. 4 is a flowchart for describing a power supply selection process in the digital camera.
Figure 5:
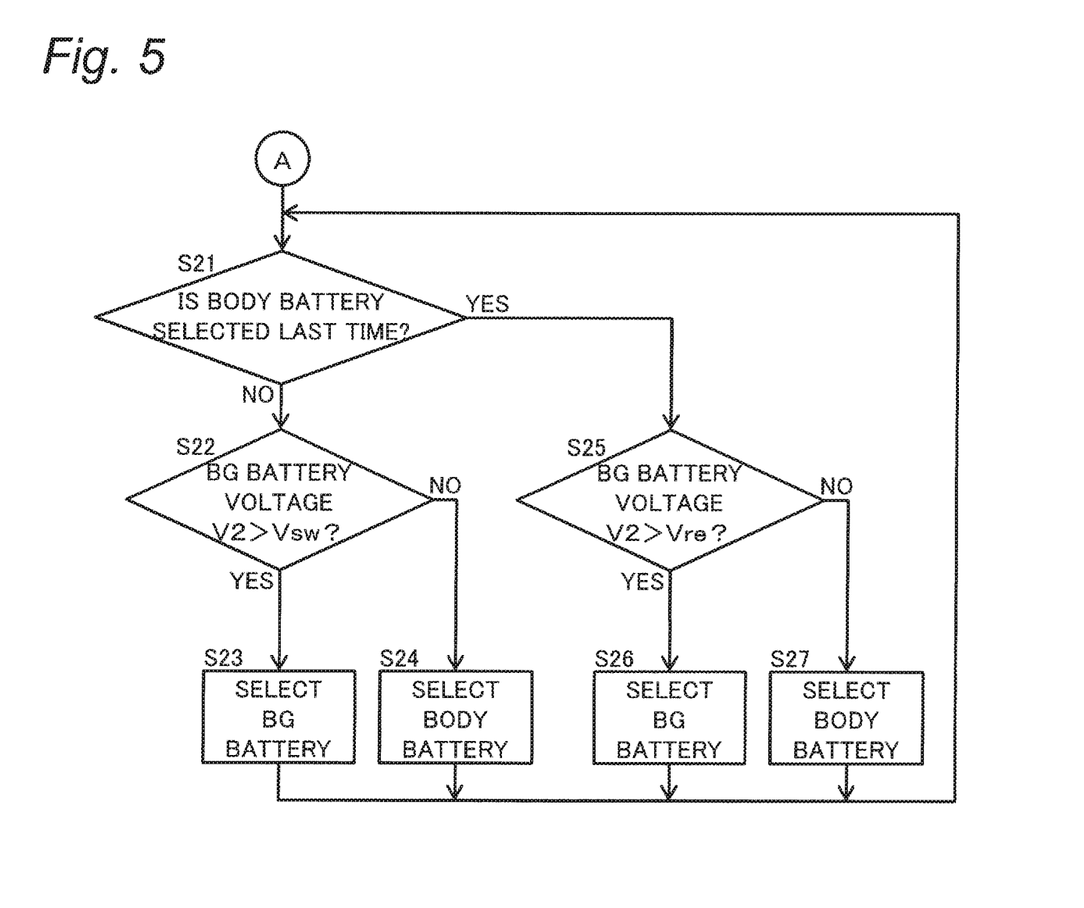
FIG. 5 is a flowchart for describing the power supply selection process subsequent to FIG. 4.

The flowchart illustrated in FIGS. 4 and 5 starts, for example, when the digital camera 100 is activated or when an operation of various operation modes is started. Each process illustrated in the flowchart of FIGS. 4 and 5 is executed by, for example, the camera controller 153 of the digital camera 100.

First, the camera controller 153 determines whether the operation mode of the digital camera 100 is the high-load mode, or the low-load mode instead of the high-load mode (S1).

When the operation mode is the high-load mode (YES in S1), the camera controller 153 detects whether, the BG battery voltage V2 is larger than the upper limit value Vsh of the load-sharing control region R1 of FIG. 3 (S2). The camera controller 153 performs the detection of step S2 on the basis of the detection value of the BS battery voltage V2 indicated by the detection signal Sv2 (FIG. 2) output from the voltage detection circuit 302 of the BG battery 202.

When detecting that the BG battery voltage V2 is larger than the upper limit value Vsh (YES in S2), the camera controller 153 selects the BG battery 202 as the current power supply (S3). At this selection, the camera controller 153 controls the gate signals B20, B21, and B22 to "L", to conduct the power supply line 330 for the BG battery 202. In addition, the camera controller 153 controls the control signals B13, B23, B14, and B24 to "L", to stop the operation of the load sharing controller 350 and interrupt the power supply lines 320 and 340 for simultaneous selection of both batteries 201 and 202. Further, the camera controller 153 controls the gate signal B12 to "H" and controls the gate signal B11 to "H", to interrupt the power supply line 310 for the body battery 201.

On the other hand, when detecting that the BG battery voltage V2 is not larger than the upper limit value Vsh (NO in S2), the camera controller 153 detects whether or not the body battery voltage V1 is larger than the upper limit value Vsh (S4). The camera controller 153 performs the detection of step S4 on the basis of the detection value of the body battery voltage V1 indicated by the detection signal Sv1 (FIG. 2) output from the voltage detection circuit 301 of the body battery 201.

When detecting that the body battery voltage V1 is larger than the upper limit value Vsh (YES in S4), the camera controller 153 selects the body battery 201 (S5). At this selection, the camera controller 153 controls the gate signal B11 to "L" and controls the gate signal B12 to "L", to conduct the power supply line 310 for the body battery 201. In addition, the camera controller 153 controls the gate signals B20, B21, and B22 to "H", to interrupt the power supply line 330 for the BG battery 202. Further, the operation of the load sharing controller 350 is stopped as in step S3.

When detecting that the body battery voltage V1 is not larger than the upper limit value Vsh (NO in S4), the camera controller 153 detects whether or not both the body battery voltage V1 and the BG battery voltage V2 are larger than the lower limit value Vuc of the control region R1 on the basis of the detection signals Sv1 and Sv2 (S6). When at least one of the body battery voltage V1 or the BG battery voltage V2 is the lower limit value Vuc or less, the camera controller 153 proceeds to NO in step S6.

When detecting that both the body battery voltage V1 and the BG battery voltage V2 are larger than the lower limit value Vuc (YES in S6), the camera controller 153 selects both batteries 201 and 202 (S7). At this selection, the camera controller 153 operates the load sharing controller 350 by controlling the control signals B13, B23, B14, and B24 to "H", and controlling the gate signal B20 to "L". Then, the power supply lines 320 and 310 for simultaneous selection of both batteries 201 and 202 are conducted. Further, the camera controller 153 controls the gate signals B11, B12, B21, and B22 to "H", to interrupt the power supply lines 310 and 320 for the body battery 201 or the BG battery 202.

When the camera controller 153 selects any one of the BG battery 202, the body battery 201, and both of the batteries 201 and 202 in a state of the high-load mode (S3, S5, S7), the processing in and after step S2 is repeated at a predetermined control cycle (for example, 0.01 seconds).

On the other hand, when detecting that both the body battery voltage V1 and the BG battery voltage V2 are not larger than the lower limit value Vuc (NO in S6), the camera controller 153 executes a process of forcibly transitioning the operation mode of the digital camera 100 to the low-load mode (S8).

The process of step S8 can be performed by various methods in which power to be used for the operation after the restriction is less than a predetermined value. For example, in a case that the high-load mode under execution is the high quality moving image mode, the camera controller 153 stops recording of image data into the memory card 164. Further, in another case that the high-load mode under execution is the high-speed continuous shooting mode, the camera controller 153 reduces a driving speed of the shutter 180.

Next, the camera controller 153 detects whether or not the BG battery voltage V2 is smaller than the lower limit value Vuc (S9). When detecting that the BG battery voltage V2 is smaller than the lower limit value Vuc (YES in S9), the camera controller 153 selects the body battery 201 (S10), as in step S5. On the other hand, when detecting that the BG battery voltage V2 is not smaller than the lower limit value Vuc (NO in S9), the camera controller 153 selects the BG battery 202 (S11), as in step S3.

After selecting the BG battery 202 or the body battery 201 (S10, S11) with the forced transition process to the low-load mode (S8), the camera controller 153 performs processing in the low-load mode (S21 to S27 in FIG. 5).

When the operation mode of the digital camera 100 is the low-load mode (NO in S1), for example as shown in FIG. 5, the camera controller 153 determines whether or not the body battery 201 is selected in the last control cycle (S21). As in this processing example the BG battery 202 is preferentially used, "NO" in step S21 means that the initial selection of the BG battery 202 has been switched to the body battery 201 in advance.

When the body battery 201 is not in particular selected (NO in S21), the camera controller 153 detects whether or not the BG battery voltage V2 is larger than a switching threshold value Vsw on the basis of the detection signal Sv2 (S22). The switching threshold value Vsw is set to a voltage value indicating a reference for switching the selection of the power supply from the BG battery 202 to the body battery 201. For example, Vsw>Vuc.

When detecting that the BG battery voltage V2 is larger than the switching threshold value Vsw (YES in S22), the camera controller 153 selects the BG battery 202 (S23) as in step S3. On the other hand, when detecting that the BG battery voltage V2 is not larger than the switching threshold value Vsw (NO in S22), the camera controller 153 selects the body battery 201 (S24) as in step S5.

Further, when the body battery 201 is selected last time (YES in S21), the camera controller 153 detects whether or not the BG battery voltage V2 is larger than a recovery threshold value Vre on the basis of the detection signal Sv2 (S25). The recovery threshold value Vre is set to a voltage value indicating a reference for returning the battery used as the power supply from the body battery 201 to the BG battery 202. For example, Vre>Vsw.

When detecting that the BG battery voltage V2 is larger than the recovery threshold value Vre (YES in S25), the camera controller 153 selects the BG battery 202 (S26) as in step S3. On the other hand, when detecting that the BG battery voltage V2 is not larger than the recovery threshold value Vre (NO in S25), the camera controller 153 selects the body battery 201 (S27) as in step S5.

After selecting the BG battery 202 or the body battery 201 (S23, S24, S26, S27), the camera controller 153 repeats the processing in and after step S21 at a control cycle similar to that in the high-load mode, for example.

According to the above process, a case of simultaneously using both batteries 201 and 202 as a power supply (S7) is restricted to a case where, in the high-load mode, the individual battery voltages V1 and V2 are between the upper limit value Vsh and the lower limit value Vuc of the control region R1 (NO in S2). This allows the power of the digital camera 100 to be efficiently used without excessively performing simultaneous selection of both batteries 201 and 202. Further, this increases the opportunity to operate in the high-load mode, in addition to a case where at least one of the two battery voltages V1 and V2 is the upper limit value Vsh or more (YES in S1 or S2), thereby utility of the digital camera 100 can be improved.

Further, when the BG battery voltage V2 is larger than the upper limit value Vsh (YES in S2), the BG battery 202 is used as a power supply regardless of the body battery voltage V1 (S3). As described above, by using the BG battery 202 preferentially over the body battery 201, power consumption by the body battery 201 can be reduced, and thus the digital camera 100 can be used easily.

In the above description, the processing example has been described in which the BG battery 202 is preferentially used. The digital camera 100 according to the present embodiment is not particularly limited to this. For example, the body battery 201 may be preferentially used, or the priority use does not necessarily need to be performed.

Further, an example has been described in which the power supply selected in the last control cycle is to be the determination target of the step S21. However, instead of this, the power supply selected at the previous activation of the digital camera 100 may be the determination target. For example, when the digital camera 100 is activated or stopped, the camera controller 153 can store a flag indicating which battery has been used in the flash memory 156, and perform the above determination with reference to the flag at the next activation.

2-3. Forced Stop Process

The digital camera 100 of the present embodiment performs the forced stop process together with the power supply selection process described above (FIGS. 4 and 5) for example, forcibly stopping the operation of the digital camera 100 when the power of each of the batteries 201 and 202 is consumed excessively.

Figure 6:
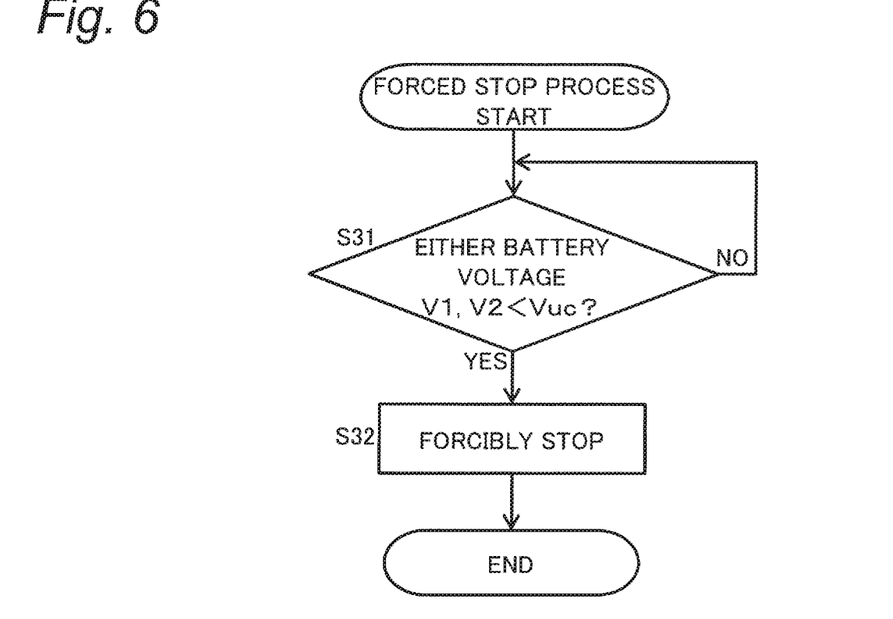
FIG. 6 is a flowchart for describing a forced stop process in the digital camera.

The forced stop process in the digital camera 100 will be described with reference to FIG. 6. The forced stop process shown in FIG. 6 is, for example, performed by the camera controller 153 in parallel with the power supply selection process (FIGS. 4 and 5), when both batteries 201 and 202 are selected (S7) for the digital camera 100 to operate with both batteries 201 and 202 being shared.

First, the camera controller 153 detects whether or not either of the body battery voltage V1 or the BO battery voltage V2 is smaller than the lower limit value Vuc of the control region R1, based on the detection signals Sv1 and Sv2 of the respective voltage detection circuits 301 and 302 (S31). The camera controller 153 repeats the detection of step S31 at a predetermined cycle while both battery voltages V1 and V2 are equal to or more than the lower limit value Vuc (NO in S31).

When detecting that either of the body battery voltage V1 or the BG battery voltage V2 is smaller than the lower limit value Vuc of the control region R1 (YES in S31), the camera controller 153 performs various processes to stop the operation in the operation mode under execution (S32). For example, when proceeding to YES in step S31 during operation of the various moving image modes, the camera controller 153 records image data of a captured moving image into the memory card 164.

When the process of step S32 is completed, the camera controller 153 ends the operation of the digital camera 100.

According to the above processing, when each of the battery voltages V1 and V2 falls below the lower limit value Vuc from the state of being within the load-sharing control region R1 (YES in S31), the operation of the digital camera 100 is forcibly stopped (S32). At this time, it is possible to terminate the operation under execution, by using the power corresponding the lower limit value Vuc remaining in each of the batteries 201 and 202.

3. Summary

As described above, the digital camera 100 of the present embodiment can be mounted with the body battery 201 that is an example of the first battery and the BG battery 202 that is an example of the second battery, for capturing an object image to generate image data. The digital camera 100 includes various load circuits in the digital camera 100, and the camera controller 153 that is an example of a control circuit. The load circuit operates the digital camera 100. The camera controller 153 controls the power supply to the load circuit, based on the body battery voltage V1 that is a first battery voltage in the body battery 201, and the BG battery voltage V2 that is a second battery voltage in the BG battery 202. The digital camera 100 has a high-load mode in which power supplied to the load circuit is equal to or more than a predetermined value (for example, 15 W), and a low-load mode in which power supplied to the load circuit is less than the predetermined value. In the high-load mode (YES in S1), the camera controller 153 selects any one of the body battery 201, the BG battery 202, and a combination of both batteries 201 and 202 in accordance with each of the battery voltages V1 and V2, to supply power to the load circuit (S2 to S11). In the low-load mode (NO in S1), the camera controller 153 selects either one of the body battery 201 and the BG battery 202 in accordance with each of the battery voltages V1 and V2, without selecting the combination of both batteries 201 and 202, to supply power to the load circuit (S21 to S27).

According to the above digital camera 100, in accordance with each of the battery voltages V1 and V2, one or both of the two batteries 201 and 202 supply power to the load circuit in high-load mode, and either the body battery 201 or the BG battery 202 supplies power in the low-load mode. That is, the case where both batteries 201 and 202 are controlled to simultaneously supply power to the load circuit is restricted to the high-load mode, and restricted in accordance with each of the battery voltages V1 and V2. This can reduce the influence of the power loss in the simultaneous selection of both batteries 201 and 202, and efficiently use the power from the plurality of batteries in the digital camera 100.

In the present embodiment, in the high-load mode, when the body battery voltage V1 and the PG battery voltage V2 are within a predetermined range of the control region R1, the camera controller 153 selects the combination of both batteries 201 and 202 (S7). In the high-load mode, when at least one of the body battery voltage V1 or the BG battery voltage V2 is outside the predetermined range, the camera controller 153 selects either one of the body battery 201 and the BG battery 202, without selecting both batteries 201 and 202 (S3, S5, S10, S11).

According to the above digital camera 100, the case where power is supplied to the load circuit from both batteries 201 and 202 simultaneously is restricted in accordance with the specific control region R1, and the influence of power loss in the simultaneous selection of both batteries 201 and 202 can be reduced.

In the present embodiment, when at least one of the body battery voltage V1 and the PG battery voltage V2 is less than the lower limit value Vuc of the control region R1 (NO in S6), the camera controller 153 restricts the operation of the high-load mode (S8). For example, by restricting the operation until the load becomes almost the same as that in the low-load mode, the digital camera 100 can be made operable even when each of the battery voltages V1 and V2 decrease.

In the present embodiment, in a state where the combination of both batteries 201 and 202 are selected (S7), when at least one of the body battery voltage V1 or the BG battery voltage V2 is less than the lower limit value Vuc of the control region R1 (YES in S31), the camera controller 153 stops the operation of the digital camera 100 (S32). This makes it possible to suspend the use of the digital camera 100 when each of the battery voltages V1 and V2 is significantly reduced during operation with both batteries 201 and 202 being shared.

In the present embodiment, in the high-load mode, when the BG battery voltage V2 is more than the upper limit value Vsh of the control region R1 (YES in S2), the camera controller 153 selects the BG battery 202 (S3). In the high-load mode, when the BG battery voltage V2 is not more than the upper limit value Vsh of the control region R1 (NO in S2) and the body battery voltage V1 is more than the upper limit value Vsh of the control region R1 (YES in S4), the camera controller 153 selects the body battery 201 (S5). This allows the BG battery 202 to be preferentially used to preserve the power of the body battery 201, and the power of the digital camera 100 to be used efficiently.

In the present embodiment, the body battery 201 is provided inside the digital camera 100. The BG battery 202 is provided to the battery grip 103, which is an example of an external device attachable to the digital camera 100. By preferentially using the BG battery 202 in the battery grip 103, which can be replaced easily, power of the digital camera 100 can be efficiently used.

In the present embodiment, the load circuit of the digital camera 100 may include at least one of the image processor 172 that processes image data, and the shutter 180 that adjusts an exposure time in capturing an object image. According to the digital camera 100 of the present embodiment, it is possible to supply power to various load circuits when operating in the high-load mode such as a high-quality moving image mode or a high-speed continuous shooting mode.

In the present embodiment, in the power supply selection circuit 300, the digital camera 100 includes the power supply lines 310, 320, 330, and 340, which are examples of the first, second, third, and fourth power supply lines, respectively, and the DC/DC converters 321 and 341, which are examples of first and second voltage converters. The power supply line 310 is arranged to connect the body battery 201 with the load circuit, to supply power to the load circuit when the body battery 201 is selected. The DC/DC converter 321 receives the body battery voltage V1 from the body battery 201 to generate the converted voltage V10. The power supply line 320 is arranged to connect the body battery 201 with the load circuit via the DC/DC converter 321, to supply power based on the converted voltage V10 to the load circuit when the combination of both batteries 201 and 202 is selected. The power supply line 330 is arranged to connect the BC battery 202 with the load circuit, to supply power to the load circuit when the BG battery 202 is selected. The DC/DC converter 341 receives the BG battery voltage V2 from the BC battery 202 to generate the converted voltage V20. The power supply line 340 is arranged to connect the BG battery 202 with the load circuit via the DC/DC converter 341, to supply power based on the converted voltage V20 to the load circuit when the combination of both batteries 201 and 202 are selected.

According to the power supply lines 310 to of the power supply selection circuit 300 described above, when either one of the body battery 201 and the BG battery 202 is selected, corresponding one of the power supply lines 310 and 330 is used, which are separate from the power supply lines 320 and 340 provided with the DC/DC converters 321 and 341 causing voltage conversion loss. Thus, it is possible to efficiently use the power supplied from each of the batteries 201 and 202.

In the present embodiment, the power supply selection circuit 300 may include the PMOSFETs 311 and 331 or the like as a switch circuit. The PMOSFET 311, provided on the power supply line 310, allows electrical conduction between the body battery 201 and the power supply line 310 when the body battery 201 selected. The PMOSFET 311 interrupts the conduction of the power supply line 310 from the body battery 201 when the combination of both batteries 201 and 202 is selected. The PMOSFET 331, provided on the power supply line 330, allows electrical conduction between the BG battery 202 and the power supply line 330 when the BG battery 202 is selected. The PMOSFET 331 interrupts the conduction of the power supply line 330 from the BG battery 202 when the combination of both batteries 201 and 202 is selected. Thus, the power supply lines 310 and 330 that are not used at the time of selection of both batteries 201 and 202 can be interrupted for the electrical conduction, and thus the power supplied to the load circuit can be efficiently used in a device provided with the power supply selection circuit 300.

In the present embodiment, the power supply selection circuit 300 may further include the load sharing controller 350 or the like as a control circuit that controls a current flowing through the power supply lines 320 and 340 such that a load is shared between the body battery 201 and the BG battery 202 when the combination of both batteries 201 and 202 is selected. The function of the load sharing controller 350 may be realized by the camera controller 153. For example, according to a device configured by the power supply action circuit 300 and the camera controller 153, as a power supply selection device that selects a power supply for the load circuit from a plurality of batteries, it is possible to efficiently use power from each battery.

OTHER EMBODIMENTS

As described above, the first embodiment has been described as an example of the technique disclosed in the present application. However, the technique in the present disclosure is not limited to this, and can also be applied to embodiments in which change, replacement, addition, omission, and the like are made as appropriate. Further, it is also possible to combine each constituent element de scribed the first embodiment above to provide a new embodiment. Accordingly, other embodiments will be exemplified below.

In the first embodiment described above, the power supply selection circuit 300a is included in the camera body 102 while the power supply selection circuit 300b is included in the battery grip 103, and the power supply selection circuit 300 is formed when the battery grip 103 is mounted to the camera body 102. However, the power supply selection circuit 300 may be formed in either one of the camera body 102 or the battery grip 103 without being divided. Further, the individual batteries 201 and 202 and the power supply selection circuit 300 may be included in one of the camera body 102 and the battery grip 103 (that is, in one electronic device).

In the first embodiment described above, a lens-interchangeable digital camera has been described as an example of an imaging apparatus, but the imaging apparatus of the present embodiment may be a digital camera that is not particularly the lens interchangeable type. Further, the concept of the present disclosure is applicable not only to digital cameras but also to various electronic devices to which batteries can be connected, such as movie cameras, mobile phones with cameras, and personal computers.

As described above, the embodiments have been described as examples of the technique in the present disclosure. For this purpose, the accompanying drawings and the detailed description have been provided.

Accordingly, some of the constituent elements described the accompanying drawings and the detailed description may also include constituent elements that are not indispensable for solving the problem in order to exemplify the above technique in addition to indispensable constituent elements for solving the problem. Therefore, these constituent elements that are not indispensable are not to be immediately recognized to be indispensable on the basis of the fact that these constituent elements that are not indispensable are described in the accompanying drawings or the detailed description.

In addition, since the above-described embodiments are intended to exemplify the technique in the present disclosure, it is possible to make various changes, replacements, additions, omissions, and the like within the scope of claims or the equivalent thereof.

The present disclosure is applicable to electronic devices to which batteries can be connected, such as digital cameras, movie cameras, and mobile phones with cameras.

The invention claimed is:

1. An imaging apparatus which can be mounted with a first battery and a second battery, for capturing an object image to generate image data, the imaging apparatus comprising:
a load circuit configured to operate the imaging apparatus; and
a control circuit configured to control power supply to the load circuit based on a first battery voltage in the first battery and a second battery voltage in the second battery, wherein
the imaging apparatus has a high-load mode in which power supplied to the load circuit is a predetermined value or more, and a low-load mode in which power supplied to the load circuit is less than the predetermined value, wherein
in the high-load mode, the control circuit selects any one of the first battery, the second battery, and a combination of the first and second batteries in accordance with the first and second battery voltages, to supply power to the load circuit wherein
the control circuit
selects the second battery, when the second battery voltage is more than an upper limit of a predetermined range, and
selects the first battery, when the second battery voltage is not more than the upper limit of the predetermined range and the first battery voltage is more than the upper limit of the predetermined range, and
in the low-load mode, the control circuit selects either one of the first battery and the second battery in accordance with the first and second battery voltages without selecting the combination of the first and second batteries, to supply power to the load circuit.

2. The imaging apparatus according to claim 1, wherein in the high-load mode, the control circuit
selects the combination of the first and second batteries when the first battery voltage and the second battery voltage are within the predetermined range.

3. The imaging apparatus according to claim 2, wherein the control circuit restricts an operation in the high-load mode when at least one of the first battery voltage and the second battery voltage is less than a lower limit of the predetermined range.

4. The imaging apparatus according to claim 2, wherein in a state where the combination of the first and second batteries are selected, when at least one of the first battery voltage and the second battery voltage is less than a lower limit of the predetermined range, the control circuit stops an operation of the imaging apparatus.

5. The imaging apparatus according to claim 1, wherein the first battery is provided inside the imaging apparatus, and
the second battery is provided to an external device attachable to the imaging apparatus.

6. An imaging apparatus which can be mounted with a first battery and a second battery, for capturing an object image to generate image data, the imaging apparatus comprising:
a load circuit configured to operate the imaging apparatus;
a control circuit configured to control power supply to the load circuit based on a first battery voltage in the first battery and a second battery voltage in the second battery;

a first power supply line arranged to connect the first battery with the load circuit, to supply power to the load circuit when the first battery is selected;
a first voltage converter configured to generate a first converted voltage based on a voltage input from the first battery;
a second power supply line arranged to connect the first battery with the load circuit via the first voltage converter, to supply power based on the first converted voltage to the load circuit when the combination of the first and second batteries is selected;
a third power supply line arranged to connect the second battery with the load circuit, to supply power to the load circuit when the second battery is selected;
a second voltage converter configured to generate a second converted voltage based on a voltage input from the second battery; and
a fourth power supply line arranged to connect the second battery with the load circuit via the second voltage converter, to supply power based on the second converted voltage to the load circuit when the combination of the first and second batteries is selected, wherein
the imaging apparatus has a high-load mode in which power supplied to the load circuit is a predetermined value or more, and a low-load mode in which power supplied to the load circuit is less than the predetermined value, wherein
in the high-load mode, the control circuit selects any one of the first battery, the second battery, and a combination of the first and second batteries in accordance with the first and second battery voltages, to supply power to the load circuit, and
in the low-load mode, the control circuit selects either one of the first battery and the second battery in accordance with the first and second battery voltages without selecting the combination of the first and second batteries, to supply power to the load circuit.

7. The imaging apparatus according to claim 6, further comprising:
a first switch circuit configured to allow electrical conduction between the first battery and the first power supply line when the first battery is selected, and interrupt the conduction between the first battery and the first power supply line when the combination of the first and second batteries is selected; and
a second switch circuit configured to allow electrical conduction between the second battery and the third power supply line when the second battery is selected, and interrupt the conduction between the second battery and the third power supply line when the combination of the first and second batteries is selected.

8. An imaging apparatus which can be mounted with a first battery and a second battery, for capturing an object image to generate image data, the imaging apparatus comprising:
a load circuit configured to operate the imaging apparatus; and
a control circuit configured to control power supply to the load circuit based on a first battery voltage in the first battery and a second battery voltage in the second battery, wherein
the imaging apparatus has a high-load mode in which power supplied to the load circuit is a predetermined value or more, and a low-load mode in which power supplied to the load circuit is less than the predetermined value, wherein in the high-load mode, the control circuit selects any one of the first battery, the second battery, and a combination of the first and second batteries in accordance with the first and second battery voltages, to supply power to the load circuit, wherein
in the high-load mode, the control circuit selects the combination of the first and second batteries when the first battery voltage and the second battery voltage are within a predetermined range, wherein
in a state where the combination of the first and second batteries are selected, when at least one of the first battery voltage and the second battery voltage is less than a lower limit of the predetermined range, the control circuit stops operation of the imaging apparatus in the high-load mode, and
in the low-load mode, the control circuit selects either one of the first battery and the second battery in accordance with the first and second battery voltages without selecting the combination of the first and second batteries, to supply power to the load circuit.

9. The imaging apparatus according to claim 8, wherein in the state where the combination of the first and second batteries are selected, when at least one of the first battery voltage and the second battery voltage is less than the lower limit of the predetermined range, the control circuit stops a currently occurring image capture operation of the imaging apparatus.

* * * * *